Feb. 15, 1955    N. J. BENNETT ET AL    2,702,126
FILTER PRESS PLATE
Filed Jan. 26, 1953
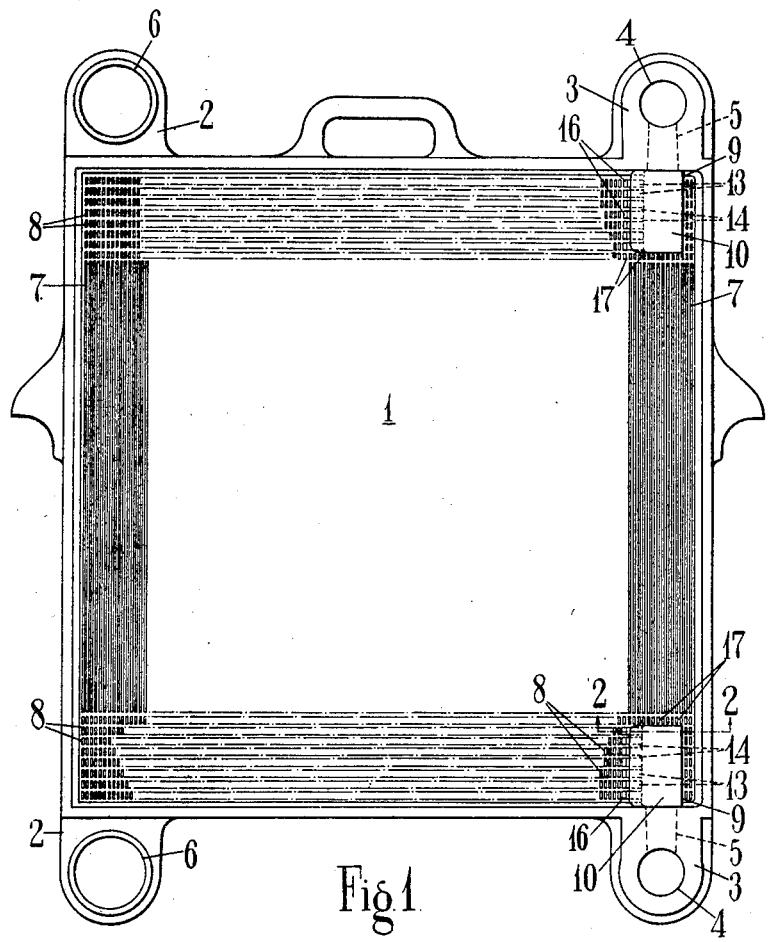
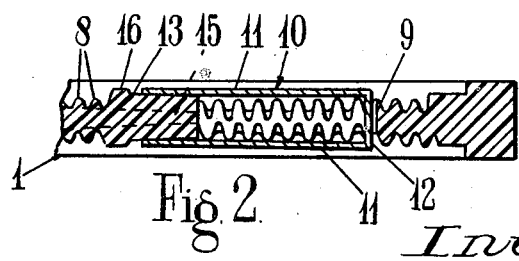
Inventors
N. J. Bennett
A. G. Hobson

2,702,126

Patented Feb. 15, 1955

2,702,126

FILTER PRESS PLATE

Nigel J. Bennett and Alan G. Hobson, Maidenhead, England, assignors to British Filters Limited, Maidenhead, England Application January 26, 1953, Serial No. 333,301

Claims priority, application Great Britain January 7, 1953

4 Claims. (Cl. 210—195)

The invention relates to filter press plates used for supporting sheets or mats of filtering material in filter presses. In British Letters Patent numbered 645,586 we have described a filter press plate in which an area of the plate adjacent an inlet or outlet passage is formed by a removable part or parts constituting a channel or channels for conveying the liquid to or from the plate surface and also serving to support the filtering material, the arrangement being such that said part or parts may be readily removed from the plate for cleaning or other purposes. The present invention is concerned with an improvement in or modification of the invention of the above-mentioned Letters Patent whereby the construction is simplified and access for cleaning or other purposes is rendered easier.

The invention comprises a filter press plate in which an area of the plate surface supporting the filtering medium in the region of an inlet or outlet port is constituted by a removable hollow part having on at least one side thereof clip means comprising spaced surfaces capable of being sprung apart and engaged over opposite sides of an edge of the plate to retain the port in the plane of the plate while permitting easy removal thereof.

In a preferred form of the invention the removable part is of flattened U-shaped or channel section and the free ends of the section can be engaged over an edge of an aperture into which the part is fitted.

In the accompanying drawing:

Figure 1 is an elevation of a double-sided filter plate provided with inlet and outlet passage arrangements constructed in accordance with the invention;

Figure 2 is a cross section taken on the line 2—2 of Figure 1.

In carrying the invention into effect according to one convenient mode as illustrated in the drawing, a double-sided filter plate 1 is provided adapted to be assembled with similar plates in a filter press of well known kind. Each plate has projecting corner lugs 2, 2 and 3, 3. The lugs 3, 3 have ports 4, 4 which extend through them, and the interior of these ports communicate with passages 5, 5 formed in the thickness of the lugs and constituting inlet or outlet passages. The lugs 2, 2 have ports 6, 6 but no communicating passages, and these ports are usually provided with inserted rubber or like bushes (not shown). It will be understood that the plates are assembled in the press with the lugs 2 and 3 in alternating succession, i. e. a lug 2 is located between each pair of lugs 3 and the previously mentioned rubber bushes form a seal between the lugs. The aligned ports 4 and 6 thus form continuous passages through which the liquid to be filtered is admitted and from which the filtered liquid is withdrawn. The opposite surfaces of the plate are grooved or channelled to permit the liquid to be dispersed over the plate and the filtering material which is clamped between adjacent plates. These channels are constituted in the example illustrated by parallel ribs 7 extending from side to side of the plate area and by interrupted ribs 8 at the top and bottom areas. Any other form of channelling may be employed. The corner areas of the plate adjacent the inlet or outlet passages 5 are formed or cut away to leave apertures 9 which in the present example are rectangular but which could be of any other convenient shape desired. These apertures are in communication with the inner ends of the inlet or outlet passages 5 in the lugs 3. Within each of the apertures 9 there is fitted a removable part 10 comprising a U-shaped clip member of metal or other material having a pair of substantially parallel faces 11 joined by an end face 12 as shown in Figure 2. At one side of each of the apertures 9 the interrupted ribs 8 are merged to form flattened ridges 13 separated by channels 14 and these channels increase in depth towards the edge of the plate as is shown by the tapering section 15 of the body of the plate as seen in Figure 2. The faces of the ridges 13 are also tapered towards the edges of the plate to receive the ends of the clip faces 11 between them. A series of transverse ridges 16 are preferably provided on either side of the plate to afford a stop for the edges of the clip faces 11. Also the channels 17 which lead from the plate surface to the ends of the apertures 9 are preferably increased in depth towards the aperture edges in the same manner as the channels 14. The arrangement is such that the U-shaped clip members 10 can readily be inserted into their respective apertures and are held in place by the engagement of the faces 11 on either side of the edges of the apertures. The faces 11 lie approximately level with the crests of the ridges of the remainder of the plate surface on both sides thereof and serve to support the filtering material over the area of the apertures which are occupied by the clip members. Liquid can flow to or from the plate surface by way of the hollow interior of the clip member and the channels 14 and 17 referred to previously, and the said hollow interior forms the communication between such channels and the passage 5. The clip member can readily be withdrawn by pressure upon one of the faces thereof which causes the edges of the clip to be disengaged from the edge of the plate aperture.

The clip member may conveniently be formed from sheet metal having sufficient resiliency to enable the desired clip action to be effected, but other materials may be employed. Whilst the U-shape of clip is to be preferred for simplicity and ease of manufacture, other forms which may include clip means on more than one side may be employed.

By this invention there is provided a very simple means of affording easy access to the inlet and outlet regions of the plate and permitting thorough cleaning thereof. Also the removable part is formed in one piece which simplifies manufacture and use. The invention can be applied to single-sided or chambered filter plates, or to plates in which the inlet and outlet ports are arranged within the general area of the plate as described in co-pending application for Letters Patent corresponding to British application No. 525/53. It will be understood that whilst a square plate has been described by way of example, the invention can be applied to plates of other shape with the inlet and outlet ports variously arranged thereon.

We claim:

1. A filter press plate having an exterior surface of channelled formation for supporting sheet filtering material between two such plates in a press and including passage means for filtration treatment medium in communication with said surface and being formed in the thickness of the plate, said plate being formed to afford an aperture extending transversely through the supporting surface of the plate and communicating with the inner end of said passageway, and a removable hollow part shaped to occupy the said aperture and to afford support for the sheet filtering material over the area thereof and constituting a spring clip having a pair of spaced resilient plate-like portions extending laterally at one edge thereof and resiliently engaged over the thickness of the plate on opposite sides thereof at one edge of the said aperture to an extent sufficient to retain the said hollow part in the plane of the plate while its other sides are unsupported in a direction transverse to said plane and such as to permit the hollow part to be readily removed by displacing it angularly with respect to the plate to spread the aforesaid resilient plate-like parts to disengage them from the plate edge.

2. A filter press plate according to claim 1, in which the hollow part comprises a single plate member of narrow channel shape the opposed free sides of which are engaged over the edge of the filter plate aperture.

3. A filter press plate according to claim 1, in which the edge portion of the plate aperture which receives the plate-like clip portions of the hollow part has a thickness less than that of the maximum thickness of the filter supporting surface of the plate.

4. A filter press plate according to claim 1, in which the edge portion of the plate aperture over which the plate-like clip portions of the hollow part are engaged has surface channels leading from the plate surface to the edge of the plate aperture and such channels increase in depth towards said aperture.

References Cited in the file of this patent

UNITED STATES PATENTS 1,302,812   Kuryla ------------------ May 6, 1919

FOREIGN PATENTS 645,586   Great Britain ------------ Nov. 1, 1950